United States Patent [19]

Alameda

[11] Patent Number: 4,557,368
[45] Date of Patent: Dec. 10, 1985

[54] FIELD CROP HARVESTING AND PACKING MACHINE

[75] Inventor: Melford N. Alameda, Fremont, Calif.

[73] Assignee: The Alameda Company, Fremont, Calif.

[21] Appl. No.: 586,248

[22] Filed: Mar. 5, 1984

[51] Int. Cl.[4] .............................................. B65G 17/00
[52] U.S. Cl. ...................................... 198/313; 53/391; 198/712; 198/861.2; 414/508; 414/523
[58] Field of Search ............... 198/313, 300, 477, 700, 198/864, 473, 678, 704, 655, 652, 307, 701, 711, 712, 797, 793; 414/508, 523; 53/391

[56] References Cited

U.S. PATENT DOCUMENTS

| | | | |
|---|---|---|---|
| 1,409,806 | 3/1922 | Witte | 198/701 |
| 1,504,846 | 8/1924 | Tarkington | 414/508 |
| 2,590,965 | 4/1952 | Huston | 198/313 |
| 2,815,853 | 12/1957 | Likens | 198/313 |
| 3,599,395 | 8/1971 | Rodriguez et al. | 53/391 |
| 4,168,597 | 9/1979 | Cayton | 53/391 |
| 4,292,784 | 10/1981 | Abatti et al. | 53/391 |

Primary Examiner—Joseph E. Valenza
Assistant Examiner—Kyle E. Shane
Attorney, Agent, or Firm—Gerald L. Moore

[57] ABSTRACT

A harvester comprising a vehicle (11) supported on wheels (12) and forming a loading platform (51) on which packers can stand to pack the produce in cartons. Wings (17, 18) extend from opposite sides of the vehicle and include hinged assemblies (22, 24) to allow folding for turning and road transportation. A continuous conveyor (50) extends the length of both wings and along the vehicle loading platform to carry produce from field level to be packed. The conveyor comprises a flexible cable (61) on which are suspended baskets (70) for carrying produce. A drive wheel (71) powers the cable and means are provided for moving this wheel relative to the vehicle to maintain the cable taut and make the conveyor operable in all positions of the wings.

8 Claims, 3 Drawing Figures

FIELD CROP HARVESTING AND PACKING MACHINE

FIELD OF THE INVENTION

This invention relates to a self propelled machine having horizontally extending wings supporting conveyors which pass by the workers cutting the field crop and allow loading the product onto the conveyor for transport to a vehicle loading platform where other workers pack the product into cartons for shipment.

BACKGROUND OF THE INVENTION

In the past few years self propelled harvesting machines of the type which are accompanied by workers who cut the product from the field crop, commonly known as "cutters", have become widely used. Such machines usually comprise a wheeled vehicle which carries a power unit and serves as a platform for the "packers" who load the product into cartons. Conveyors that extend out along the wings to carry the product back to the vehicle have usually comprised power driven belts supported on rollers. The wings must be made in a manner to allow folding for turning of the vehicle at the ends of the field and for transportation along the highways. Thus, the conveyor systems have usually been assembled in sections to allow folding. Belt type conveyors are difficult to utilize when changes in elevation are effected for lifting the product from the level of the cutters to the level of the packers. Additionally the trend is towards more careful handling of fresh produce to make it more saleable at the marketplace and to increase shelf life.

It is the purpose of the present invention to provide an improved field harvesting apparatus which provides for a uniform and careful transporting of the product from the field level to the packers and yet is easily manueverable and can be quickly activated for turning around in the fields and for road transport.

SUMMARY OF THE INVENTION

A harvester for loading product into cartons in the field comprising a wheeled vehicle having a platform on which the packers can stand and load the product into cartons. Wings extend in each direction from the wheeled vehicle and carry a conveyor which runs the length of both wings and then extends around and up on the wheeled vehicle to the packer level. The conveyor comprises a flexible member from which hang supports for trays or baskets so as to be maintained at a level atitude while the conveyor changes elevations. Additionally, means are provided for maintaining the conveyor flexible member taut, such that with the changes of elevation of the wings for leveling and turning, the conveyor system remains operational.

DESCRIPTION OF THE INVENTION

Figure 1:
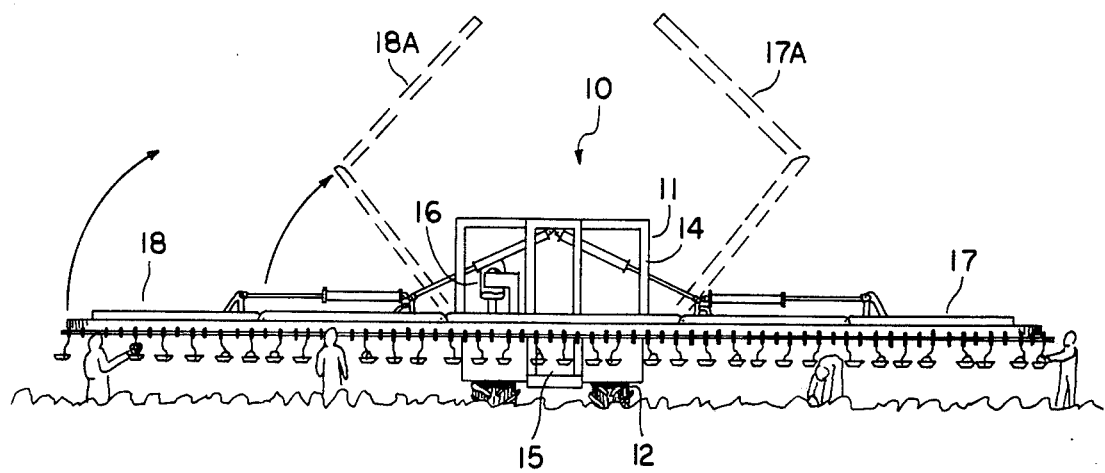
FIG. 1 is a front plan view of a field harvester employing the present invention.
Figure 3:
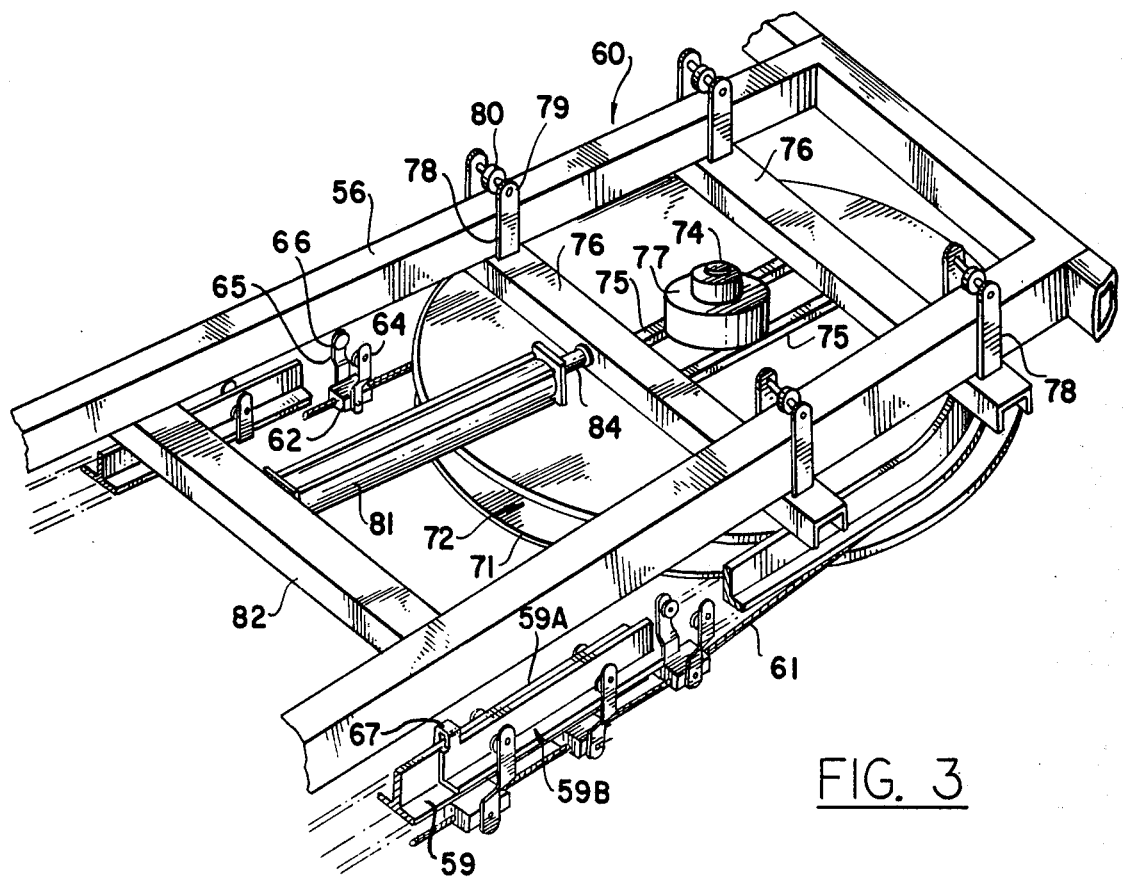
FIG. 3 is an enlarged perspective view of the conveyor tension regulating apparatus.
Figure 2:
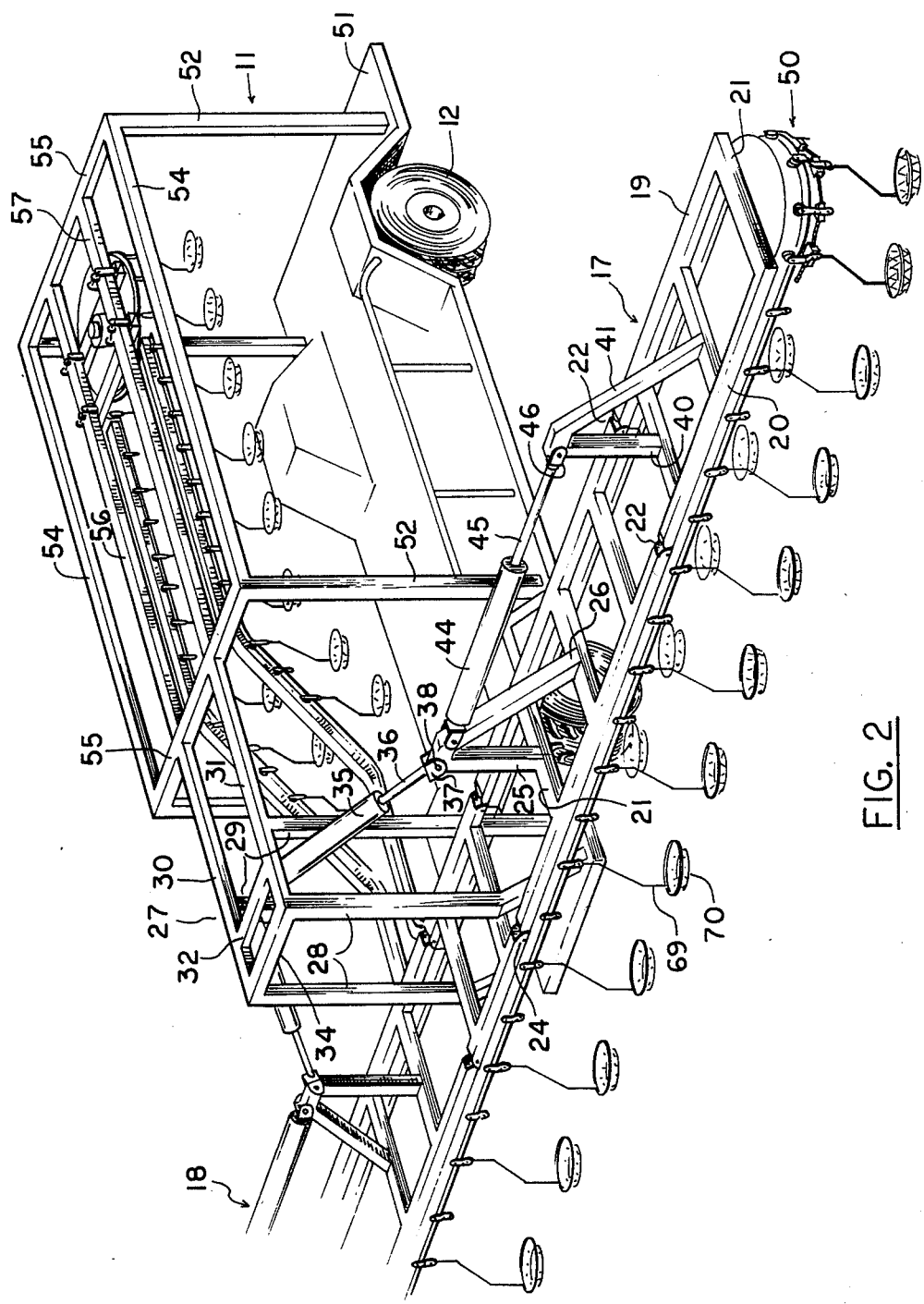
FIG. 2 is a partial perspective view of the field harvester.

In FIG. 1 is shown a field harvester 10 embodying the present invention. As illustrated, a vehicle 11 is supported on four wheels 12 and includes a frame 14. A power unit 15 propels and powers the vehicle which is steered by an operator positioned at a steering assembly 16.

In this embodiment shown, the unit includes a pair of wings 17 and 18 extending horizontally from opposite sides of the vehicle. The wings have a ladder construction with side members 19 and 20 attached by cross members 21 spaced therealong. Each wing also includes an outboard hinge assembly 22 and an inboard hinge assembly 24, positioned to connect the side members 19 and 20 at points of discontinuance. Interruption of the side members at these inboard and outboard locations allows the wings to be folded to the dotted line positions 16A and 17A shown in FIG. 1 to substantially right angles to the connecting section while the inner section can be folded to substantially a vertical position (not shown).

The folding of the wings is necessary both for leveling the wings and for transportation. Because the wings extend a substantial distance from the wheeled vehicle and the wheeled vehicle must manuever through plowed or soft fields, it is frequently necessary to raise and lower the wings for leveling purposes to prevent them from touching the ground. The wings must be positioned sufficiently low to allow easy reach by a cutter standing on the ground, but obviously must not touch the ground as the vehicle is propelled forward.

For folding each wing at the inboard hinges 24, a stanchion 25 is fixed to extend upward from one cross member 21 and attached to a brace 26 extending to the next adjacent outboard cross member. A forward frame 27 is fixed to the vehicle and comprises uprights 28 and 29, with top horizontal members 30 and 31 connected by lateral members 32 and 34. Fixed to the lateral member 32 is an actuator 35 including an actuating shaft 36 to which is attached a bracket 37 fixed by a pin 38 to the upper end of the stanchion 25. By energization of the actuator so as to retrieve the shaft 36, the wing is caused to pivot upwards, which action might be necessary for leveling purposes or, if pivoted completely upwards, for transportation purposes.

For raising the tip of the wing, a stanchion 40 is fixed to the next adjacent lateral member outboard of the hinges 22 with a brace 41 attached to the next lateral member and extending to the upward end of the stanchion. An actuator 44 is attached at one end to the brace 26 and includes a shaft 45 fixed by a pin 46 to the upper end of the stanchion 40. By energization of the actuator, the outboard end of the wing can be caused to pivot about the hinges 22.

When in the horizontal loading position, the wings extend approximately waist high allowing the cutters to load product on the conveyor 50. The product is transported to the vehicle loading platform 51 on which the packers stand for off loading the product and placing it into cartons (not shown). An overhead frame supports the conveyor and comprises a plurality of uprights 52, one positioned at each corner of the platform and connected by side frame members 54 and lateral frame members 55. Supports 56 and 57 also extend lengthwise between the lateral members 55.

The conveyor 50 moves right to left the length of both wings across the front of the harvester, reverses back along the wing 16, and then passes rearward substantially the length of the wheeled vehicle to once again reverse direction and proceed forward to the wing 17, where it again proceeds outward to the wing end. The conveyor is continuous and includes a trolley or rail 59 having an inverted T configuration. The rail forms a continuous path to a drive unit 60 positioned at the rear of the vehicle.

The conveyor includes a continuous flexible member in the form of a steel cable 61, supported at spaced intervals on blocks 62 having extending upward therefrom support members 64 and 65 with rollers 66 fixed to the inside top end. These rollers ride on the rail cross piece 67 of the rail and are guided by the rail upright member 68. Extending downward periodically from the support blocks are vertical rods 69 fixed at the lower end to baskets or trays 70. The rods are bent so as to center the basket beneath the support block so that product can be placed in the basket for transportation to the packers. The carrier is pivotably attached to the associated block by passage through an opening therein so as to swing pendulum fashion and thereby remain level at all times as the conveyor changes elevations.

For driving the conveyor, there is provided at the rear of the wheeled vehicle a drive wheel 71, having an outer recess 72 into which fits the cable 61. The wheel is supported on a central shaft 74 which is journaled for rotation relative to support members 75 extending between the frame members 76. By energization of a motor 77, the shaft 74 is turned to rotate the drive wheel and thus drive the cable 61. The rail extends beneath the outer periphery of the drive wheel such that the reversal of the direction of the conveyor cable is followed by the attached blocks 62.

Frequently when the wings are raised and lowered, the distance between the rail ends at the hinge areas varies sufficiently to change the length of the path of the conveyor. When such occurs, the conveyor cable will either become more taut or will relax, which can cause a malfunction of the conveyor. Additionally, with the cable maintained taut, close control over the conveyor is maintained so as to provide a uniform movement of the basket.

To maintain the cable taut, the mounts 76 have fixed thereto the uprights 78 extending on either side of the frame members 56 and 57. Pins 79 extend between each pair of uprights above the frame members with a roller 80 mounted on each pin. Thus, the drive for the conveyor can be moved along the support frame members 56 and 57. To control the movement of the drive assembly and thereby control the tension on the conveyor cable, a hydraulic actuator 81 extends from a cross beam 82 with a shaft 84 fixed to the adjacent support beam 76. By energization of this actuator, the drive unit can be moved back and forth along the frame to change the length of the path of the conveyor and thereby alter the tension on the conveyor cable. The rail is interrupted with the ends 59A and 59B overlapping and a clip 67 fixed to the end 59B and extending over the rail end 59A to maintain the rails in alignment such that the rollers 80 can ride therealong. Thus, as necessary, the cable can be tightened or loosened with the raising and lowering of the wings.

By providing individual baskets, which swing from the conveyor, the baskets always remain level and allow easy change of altitude on the conveyor as is necessary to transport the product from the wing level to the packing level. Additionally, by providing individual baskets for the product, the product is handled and transported carefully to prevent damage. A maximum rate of product is established by the density of the baskets such that the packers can adjust to a maximum rate of packing. Any product which is not removed by the packers merely returns along the path of the conveyor to be circulated again past the packers and alert the operator that the cutters are getting ahead of the packers.

The invention claimed is:

1. A harvester for loading product into cartons in the field, comprising:
    a wheeled vehicle having a platform on which workers can stand and load product into cartons,
    a wing extending from at least one side of said wheeled vehicle, said wing including hinged joints to allow the ends to be folded vertically to level the wing as the vehicle rolls over uneven ground and to reduce the width of the harvester for turning the road and transportation,
    a conveyor comprising:
    a trolley rail extending continuously along the length of said wing and reversing direction at the end of said wing end to extend back to the vehicle and thereafter turning rearward along substantially the length of the vehicle with a 180 degree turn near the rear of the vehicle to return back to said wing,
    an endless flexible member mounted on rollers riding on said trolley rail,
    a plurality of hanging trays each including a vertically extending support fixed at the upper end to said flexible member,
    a drive motor for driving said flexible member along said trolley rail to move said trays the length of said wing and then back along said wing to the vehicle and the length of said vehicle and back to the wing,
    means to raise and lower the outer hinged ends of said wing to allow turning, leveling and road transportation of said harvester, and
    means to maintain said flexible member taut as the wing end is raised and lowered thereby to enable the conveyor to function as the wing is raised and lowered for leveling and to prevent the flexible member from entangling when the wing end is raised for turning and road transportation.

2. A harvester as defined in claim 1 including a wing extending laterally from each side of said wheeled vehicle and said trolley rail extending along the length of each wing.

3. A harvester as defined in claim 2 wherein said vertically extending support is pivotably attached to said flexible member.

4. A harvester as defined in claim 1 wherein said means to maintain said flexible member taut include a drive wheel positioned to effect said 180 degree turn in said flexible member near the end of said vehicle and drivingly connected to said drive motor, and means to move said drive wheel relative to said wheeled vehicle to lengthen and shorten said trolley rail.

5. A harvester as defined in claim 4 including overlapping rail sections on said trolley rail positioned adjacent said drive wheel and means to lengthen and shorten said trolley rails as said drive wheel is moved.

6. The method of harvesting produce in the field comprising the steps of:
    providing a wheeled vehicle having a packing platform and having at least one folding wing extending from the vehicle side,
    mounting a flexible member endless conveyor on said vehicle extending out and back along said wing and back along said vehicle past the packing platform, mounting hanging baskets on said conveyor to receive and hold produce and carry it from the wing to said packing platform, providing means to raise and lower the wing end to level said wing and to fold the wing for turning said vehicle, and providing means to maintain said conveyor flexible member taut as said wing is folded to maintain said conveyor operable.

7. The method of harvesting as defined in claim 6 including the step of providing two folding wings on said vehicle and extending from each side thereof and mounting the flexible member to move along the length of both wings.

8. A harvester for loading product into cartons in the field comprising:
- a wheeled vehicle having a platform on which workers can stand and load product into cartons,
- a wing extending from at least one side of said wheeled vehicle, said wing including hinged joints to allow the ends to be folded vertically to level the wing as the vehicle rolls over uneven ground and to reduce the width of the harvester for turning the road and transportation,
- an endless conveyor comprising:
- an endless flexible member mounted on rollers to extend along said wing and along said vehicle,
- a plurality of hanging trays each including a vertically extending support fixed at the upper end to said flexible member,
- a drive motor for driving said flexible member lengthwise to move said trays along said wing and said vehicle to carry product loaded thereon at the wing back to the vehicle,
- means to raise and lower the outer ends of said wing to allow leveling and road transportation of said harvester, and
- means to maintain said flexible member taut as the wing is raised and lowered thereby to maintain the conveyor operable.

* * * * *